United States Patent [19]

Brown et al.

[11] Patent Number: 5,859,968
[45] Date of Patent: Jan. 12, 1999

[54] DATA SECURITY DEVICE FOR CONTROLLING ACCESS TO EXTERNAL DATA DRIVES

[75] Inventors: Mark S. Brown, Escondido, Calif.;
Ada G. Berg, 1400 Oak Hill Dr. #724, Escondido, Calif. 92027

[73] Assignee: Ada G. Berg, Escondido, Calif.

[21] Appl. No.: 624,227

[22] Filed: Mar. 29, 1996

[51] Int. Cl.[6] .................................................. G06F 12/14
[52] U.S. Cl. ............................................................ 395/186
[58] Field of Search ...................................... 395/186, 726, 395/750.01, 856; 70/78, 262, 344; 364/234, 969, 184, 222.5, 286.4, 286.5; 326/8; 369/69, 70, 243, 292

[56] References Cited

U.S. PATENT DOCUMENTS

| | | | |
|---|---|---|---|
| 4,951,249 | 8/1990 | McClung et al. | 364/900 |
| 5,077,722 | 12/1991 | Geist et al. | 369/75.1 |
| 5,126,890 | 6/1992 | Wade et al. | 360/60 |
| 5,287,519 | 2/1994 | Dayan et al. | 395/700 |
| 5,313,639 | 5/1994 | Chao | 395/725 |
| 5,477,213 | 12/1995 | Atarashi | 340/825.31 |
| 5,506,990 | 4/1996 | Holman, Jr. | 395/750 |
| 5,542,044 | 7/1996 | Pope | 395/186 |
| 5,552,776 | 9/1996 | Wade et al. | 340/825.31 |
| 5,581,763 | 12/1996 | Hait | 395/186 |
| 5,630,057 | 5/1997 | Hait | 395/186 |
| 5,642,805 | 7/1997 | Tefft | 200/43.08 |

*Primary Examiner*—Robert W. Beausoliel, Jr.
*Assistant Examiner*—Stephen C. Elmore
*Attorney, Agent, or Firm*—Donn K. Harms

[57] ABSTRACT

A data security device for a computer system controls the addition and removal of data using an external data drive. The computer system includes a microprocessor, memory, internal data storage, a power supply, and an external data drive. An access controller is coupled between the power supply and the external data drive. The access controller selectively makes or breaks an electrical connection between the power supply and the external data drive to prevent the addition or removal of data from the computer system using the external data drive. The access controller preferably includes a switch coupled to the power supply which has on and off states. A timer, coupled to the switch, generates a timing signal when the switch is in the off state for a first period. A switching device such as a relay or a transistor makes an electrical connection between the switch and the external data drive before the timing signal is received. The switching device breaks the electrical connection when the timing signal is received. A lock and key controls the operation of the access controller.

20 Claims, 2 Drawing Sheets

DATA SECURITY DEVICE FOR CONTROLLING ACCESS TO EXTERNAL DATA DRIVES

BACKGROUND OF THE INVENTION

1. Technical Field

This invention relates to computers and, more particularly, to a device for limiting the addition and removal of data from a computer using an external data drive.

2. Background

Businesses often store sensitive data, such as customer and pricing lists, marketing plans, new product specifications, etc., in the internal storage media of computers. Internal storage media includes hard drives located locally such as within the computer housing or remotely connected by a server. These computers are often readily accessible by one or more employees both during and after business hours. A significant problem exists due to employees who steal or otherwise misuse the sensitive information stored on the computers. Part of the problem is that the sensitive information can be readily transferred from the computers to floppy disks, tapes or other portable storage media using an external drive connected to the computer. Employers are hesitant to remove the external drives especially when information must be added and removed from the computer using portable storage media during the normal course of business.

Employees also tend to bring computer software, such as games, to work and to install the computer software on the work computer using the external data drives. When the employee is not being watched, the employee plays the games during business hours instead of working. As can be appreciated, the effects of reduced productivity can be significant. Once the employee's software is loaded onto the computer, it is difficult to catch the employee playing the games without regularly monitoring the employee. Most computer games can be switched off quickly and/or include a screen which resembles a spreadsheet to fool the employer. Therefore, the employer is faced with either allowing the employee to play the games or paying for another employee to regularly monitor other employees. Both options are costly.

Another problem may occur when employees load computer software onto the computer. The employee's computer program or computer disk is sometimes corrupted by a virus which is inadvertently transferred to the work computer when the employee loads the computer software using the external data drive. Viruses destroy important files stored on the work computer and cause additional productivity losses. Disgruntled employees may purposely load a virus into the work computer after being fired.

Conventional access restriction devices prevent the use of the computer entirely by disabling the keyboard, hard drive, etc. When in a disabled mode, conventional access restriction devices prevent a complete bootup which in turn prevents the use of the computer. Manual data entry and other tasks (which do not require the addition and/or removal of information using the external data drives) cannot be performed.

Software based access control systems for controlling access to external data drives can easily be circumvented through the use of self-booting disks. Password-based access control systems are subject to security lapses such as inadvertent or purposeful disclosure of the passwords.

Therefore, a device which addresses the above-noted problems and which allows an employer or supervisor to control the addition and removal of data using external data drives without affecting the use of the computers in other modes is desirable.

SUMMARY OF THE INVENTION

A data security device according to the present invention for a computer system controls the use of an external data drive connected to the computer system. The computer system includes a microprocessor, memory, internal data storage, a power supply, and an external data drive. An access controller, coupled between the power supply and the external data drive, makes or breaks an electrical connection between the power supply and the external data drive to allow or prevent the addition and removal of information from the computer system using the external data drive.

In other features of the present invention, the access controller includes a switch and a lock and a key which control the position of the switch. Alternately, the access controller includes a electronic switching device such as a relay or transistor having an output coupled to the external data drive. A timer has a first output coupled to the switching device.

In another aspect of the invention, a data security device according to the present invention controls the addition and removal of data using an external data drive coupled to a computer system. The computer system includes a microprocessor, memory, internal data storage, a power supply, and an external data drive. The access controller is coupled between the power supply and the external data drive. The access controller selectively makes or breaks an electrical connection between the power supply and the external data drive to allow or prevent the addition and removal of information from the computer system using the external data drive. The access controller includes a switch coupled to the power supply and having on and off states. A timer is coupled to the switch and generates a timing signal when the switch is in the off state for a first period. A switching device, coupled to the timing means and the switch, makes an electrical connection between the switch and the external data drive until the timing signal is generated. The switching device breaks the electrical connection after the timing signal is generated.

In other features of the invention, when the switch is in the on state, the switch couples the power supply to the external data drive. When the switch is in the off state, the switch couples the power supply to the timing means and the switching device.

A method according to still another aspect of the present invention controls the addition and removal of data from a computer system using an external data drive coupled to the computer system. The method includes the step of providing a switch, a lock and a key. Using the switch, the lock and the key, an electrical connection between a power supply and the external data drive is established or broken. By disconnecting the external data drive, the addition or removal of information from the computer system using the external data drive is prevented.

In another feature of the invention, the switch is coupled between the power supply and the external data drive. A timing signal is generated when the switch remains in a first state for a first period. An electrical connection is made between the switch and the external data drive before the timing signal is generated. After the timing signal is generated, the electrical connection is broken.

Still other objects, features and advantages will be readily apparent from the specification, drawings and the claims which follow.

BRIEF DESCRIPTION OF THE DRAWINGS

The various advantages of the present invention will become apparent to those skilled in the art after studying the following specification and by reference to the drawings in which:

FIG. 5 is a perspective view of the access controllers of FIGS. 1–4 installed on a computer;

FIG. 6 is an enlarged frontal view of a key for use with the access controller of FIG. 5; and FIG. 7 is an enlarged frontal view of a lock illustrated in FIG. 5.

DESCRIPTION OF THE PREFERRED EMBODIMENT

The present invention will now be described more fully hereinafter with reference to the accompanying drawings in which preferred embodiments of the invention are shown. This invention may, however be embodied in many forms and should not be construed as limited to the embodiments set forth herein. For purposes of clarity, the same reference numbers will be used in the Figures to consistently identify the same element.

Figure 1:
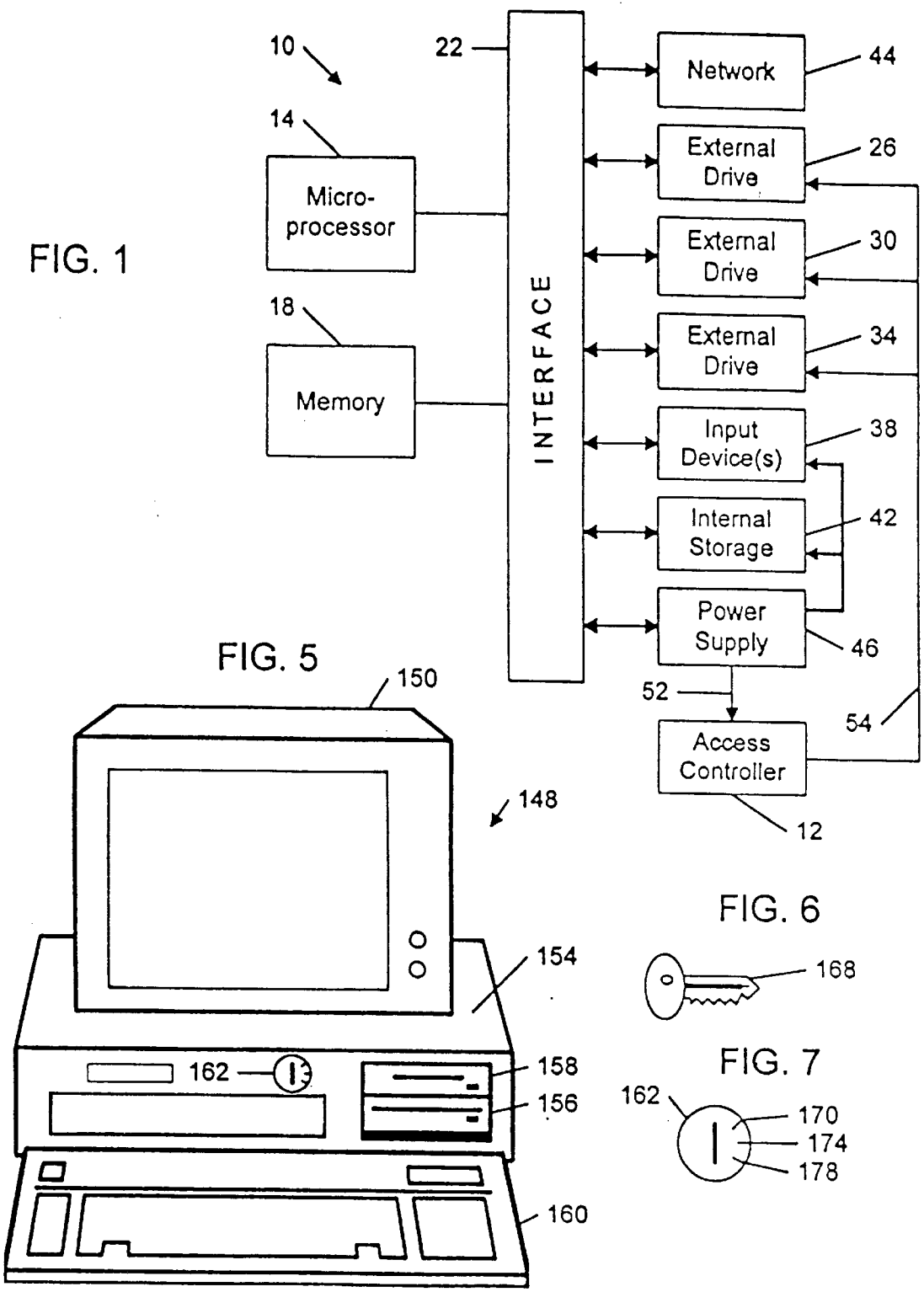
FIG. 1 is a functional block diagram of a computer system including an access controller according to the invention.

Referring to FIG. 1, a functional block diagram of a computer system 10 incorporating an access controller 12 according to the present invention is illustrated. Computer system 10 includes a microprocessor 14, internal memory 18, and an interface 22. One or more external data drives 26, 30, 34 are coupled to interface 22. Drives 26, 30, 34, such as floppy drives, tape drives, optical drives, etc., allow data to be read from or written to computer system 10. One or more input device(s) 38, such as a keyboard, mouse, etc., are likewise coupled to interface 22. Internal storage 42 such as a hard drive located within a computer housing (shown in FIG. 6) stores data, such as customer and pricing lists, marketing plans, new product specifications, etc. Computer system 10 can be coupled to a network 44 such as a local or wide area network. Skilled artisans can appreciate that access controller 12 would prevent the use of external data drives 26, 30, 34 to add or remove information from network 44 using computer system 10.

A power supply 46 is coupled to interface 22 and provides power to external data drives 26, 30, 34, input devices 38, and internal storage 42 under control of microprocessor 14. While power supply 46 is directly coupled to external data drives 26, 30, 34, input devices 38, and internal storage 42 in FIG. 1, skilled artisans can appreciate that power connections can be made through interface 22 or in any other suitable manner.

Access controller 12 is coupled between power supply 46 and external data drives 26, 30, 34. Access controller allows a supervisor to selectively turn power to the external data drives 26, 30, 34 on and off. In a preferred embodiment, access controller 12 is coupled by connector 52 to power supply 46. A connector 54 connects access controller 12 to external data drives 26, 30, 34. Using access controller 12, the supervisor selectively connects and disconnects power from external data drives 26, 30, 34 on an as needed basis.

Therefore, when an employee needs to add or remove information from computer system 10, the supervisor must be present and can monitor the information being added to or removed from computer system 10. As a result, the employer can gain control of the removal of sensitive information. The employer can also prevent the addition of employee computer software, such as games, onto the computer. Furthermore, the employer can reduce or eliminate the use of computer disks or other storage media brought by the employee which may be corrupted by viruses.

Figure 2:
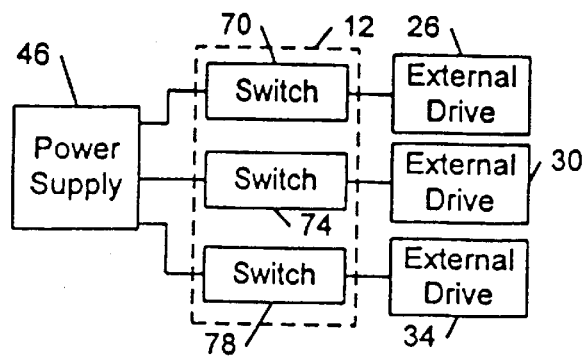
FIG. 2 is a functional block diagram of an access controller according to a first embodiment of the present invention.

Referring to FIG. 2, access controller 12 according to a first embodiment of the present invention is shown. Access controller 12 includes one or more switches 70, 74, 78 which make or break an electrical connection between power supply 46 and external data drives 26, 30, 34. Switches 70, 74, 78 are preferably single pole, single throw switches. Preferably, switches 70, 74, 78 are switches controlled by a lock and key. In other words, a key is required to move the switches to make or break the connection between power supply 46 and the corresponding external data drive 70, 74, 78. The supervisor or other person who controls access to the key also controls the addition and removal of information from computer system 10 using external data drives 26, 30, 34.

As can be appreciated, key switches are advantageous because they require the physical presence of the person who has a key (preferably a supervisor) to turn the switches on and off. Skilled artisans can appreciate that devices other than keys can be employed, for example electronic switching devices which are separate from the computer system and which require a password, a voice sample, a fingerprint, other unique "keys" which are controlled by a supervisor. Such electronic switching devices should be self-contained and not be dependent upon computer system 10 because such systems could be circumvented through the use of self-booting disks.

In use, switches 70, 74, 78 are turned to the "open" or "off" position so that the connection between power supply 46 and external data drive 26, 30, 34 is broken. Therefore, computer system 10 will bootup using data stored on internal storage media 42, such as an internal hard disk, and will operate as if computer system 10 lacks external data drives 26, 30, 34. When an employee needs to add or remove information from internal storage 42 and/or network 44, the employee must contact the supervisor to have at least one of switches 70, 74, 78 turned to "closed" or "on" position so that data can be added or removed from internal storage 42. As a result, the supervisor can monitor the information added to internal storage 42 and/or network 44.

Figure 3:
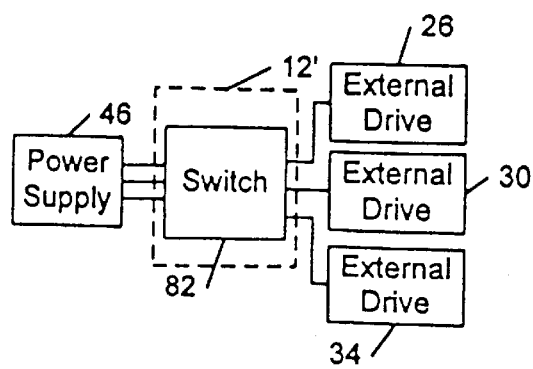
FIG. 3 is a functional block diagram of an access controller according to a second embodiment of the present invention.

Referring to FIG. 3, access controller 12' according to a second embodiment of the present invention is shown. Access controller 12' includes a single switch 82 for multiple external data drives 26, 30, 34. In a preferred embodiment, switch 82 is a multiple pole, multiple throw switch. Alternately, switch 82 can be a single pole, multiple throw switch if desired.

Figure 4A:
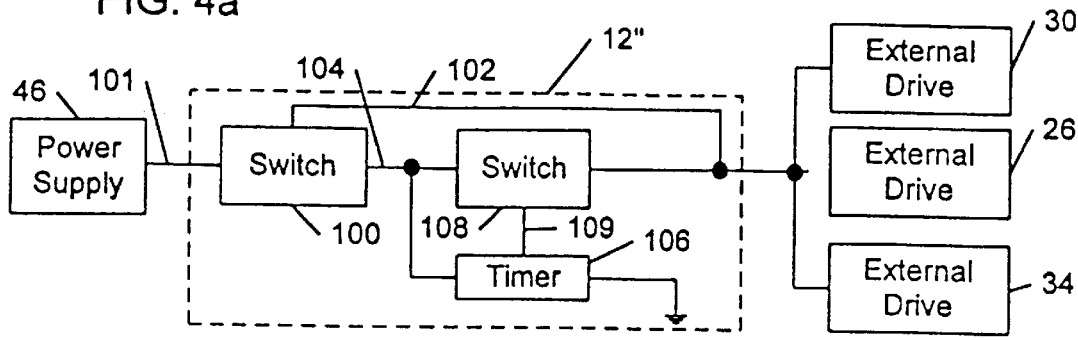
FIGS. 4a, 4b, and 4c are functional block diagrams of an access controller according to a third embodiment of the present invention.

Referring to FIG. 4a, access controller 12" according to a third embodiment of the present invention is shown. Some computer systems 10 run a diagnostic routine when booting up. The diagnostic routine determines whether the external data drives are operational. If power supply 46 is not connected to external data drives 26, 30, 34 because a switch associated with access controller 12 is open, computer system 10 will signal an error and prevent further use of computer system 10 until the problem is fixed—for example by reconfiguring the system without the external data drives. Access controllers 12 and 12' will not work with these computer systems unless the supervisor turns the switches to the closed position during bootup and thereafter opens the switches.

Access controller 12" alleviates the problems associated with the above-described types of computer systems 10. Access controller 12" includes a switch 100 having an input 101 and first and second outputs 102, 104. Preferably, switch 100 is a switch which is controlled by a key. In a highly preferred embodiment, switch 100 is a mechanical switch. Access controller 12" further includes a timer 106 and a switch 108. Preferably switch 108 is an electrical switch. Preferably, switch 100 is a single pole, double throw switch. Timer 106 preferably provides a timing signal on output line 109 after a first period has elapsed.

When switch 100 is in an "on" position, external data drive 26 is enabled. Switch 100 couples input 101 from power supply 46 to first output 102 which is coupled to external data drive 26. Therefore, external data drive 26 receives a power signal from power supply 46. Employees can add or remove information using external data drives 26 with or without supervision.

When switch 100 is in an "off" position, external data drive 26 is temporarily enabled for the first period. Switch 100 connects power received on input line 101 from power supply 46 to switch 108 and timer 106. Switch 108 initially connects power to external data drive 26. When timer 106 has received the input signal from power supply 46 for a duration exceeding the first period, timer 106 generates a timing signal on line 109 which triggers switch 108. Switch 108 switches to an open state and breaks the electrical connection between power supply 46 and external data drive 26.

If computer system 10 includes additional external data drives, such as external data drives 30, 34, additional switches 100, timers 106 and switches 108 would preferably be used if separate control of external data drives 30, 34 is desired. If separate control is not desired, switch 100, timer 106 and relay 108 can be used to turn multiple external data drives "on" and "off".

Figure 4B:
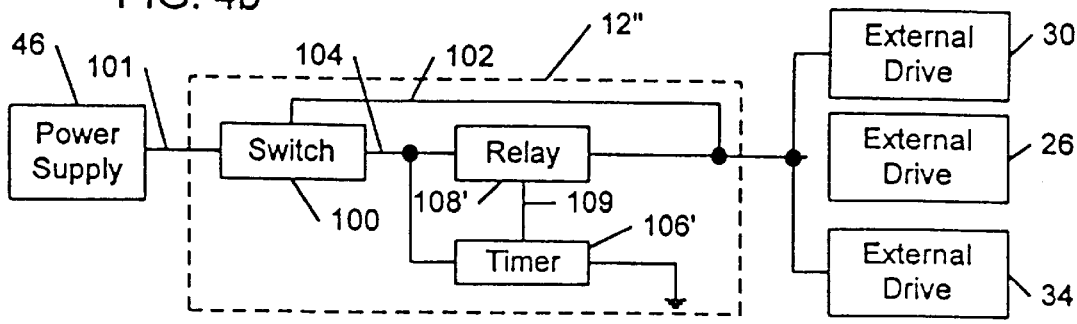
Figure 4C:
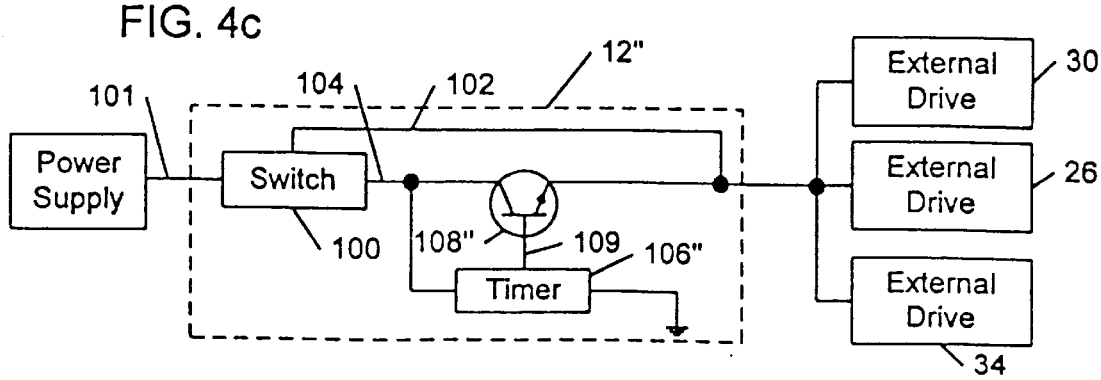

Referring to FIG. 4b, skilled artisans can appreciate that switch 108 can be a relay 108'. Referring to FIG. 4c, skilled artisans can appreciate that switch 108 can be a transistor 108". Still other types of switches 108 will be readily apparent.

Skilled artisans can appreciate that external drives 26, 30, 34 may include plural "hot" lines and/or ground connections which may need to be broken to fully disable external data drives 26, 30, 34. As can be appreciated by skilled artisans, computer system 10 can finish the boot-up diagnostic and allow the user to operate computer system 10 without the problematic error messages. Preferably the first period is greater than the amount of time required to bootup. The first period should be long enough to prevent the error messages but short enough to prevent a user from adding or removing information after bootup has occurred but not too long such that a user can add or remove data from computer system 10.

While relays, timers and switches have been disclosed, skilled artisans can appreciate that other mechanical and/or solid-state electronic switching devices may be employed to accomplish the same results without departing from the scope of this invention. For example, access controller can employ triggers, Boolean gates, transistors, operational amplifiers, diodes, capacitive charging circuits, and/or other conventional circuits which performs the functions described above. Such electronic switching devices should not be controlled by computer system 10 because the devices can be circumvented by self-booting disks.

Referring to FIG. 5, a computer system 148 is illustrated and includes a monitor 150, a computer housing 154 and a keyboard 160. Computer system 148 includes a first disk drive 156 and a second disk drive 158. Access controller 12 includes a multi-position lock 162 which can be switched between the multiple positions using a key 168 shown in FIG. 6. When the lock is in the position illustrate in FIG. 5, both drives 156, 158 are in the "on" position. When key 168 is used to adjust the position of lock 162, one or both disk drives 156, 158 are turned "off". For example, when lock 162 is in a first position 170 (FIG. 7), disk drive 156 is turned "off" and disk drive 158 is turned "on". When lock 162 is in a second position 174, disk drive 156 is turned "on" and disk drive 158 is turned "off". When lock 162 is in a third position 178, disk drives 156, 158 are turned "off". As can be appreciated, lock and key devices can be used with any of access controllers 12, 12', 12" disclosed herein. Other types of lock and key systems can be employed.

Skilled artisans will recognize that the present invention allows control over the addition and removal of data from a computer system. Sensitive data, such as customer and pricing lists, marketing plans, new product specifications, etc., can be protected. Employees will be unable to add computer software such as games to the computer system and the resulting productivity losses can be avoided. The purposeful or inadvertent addition of viruses to the computer system can also be reduced or eliminated.

Other modifications and embodiments of the invention will be readily apparent to skilled artisans who have the benefit of the foregoing teachings presented in the description and associated Figures. Therefore, it is to be understood that the invention is not to be limited to the specific embodiments disclosed herein.

What is claimed is:

1. A data security device for a computer system which controls the use of an external data drive connected to the computer system, comprising:

a computer system including a microprocessor, memory, internal data storage, a power supply, and an external data drive; and access control means, coupled between said power supply and said external data drive, for selectively making or breaking an electrical connection between said power supply and said external data drive to allow or prevent addition and removal of data from said computer system using said external data drive.

2. The computer system of claim 1 wherein said access control means includes a mechanical switch.

3. The computer system of claim 1 wherein said access control means includes:

a switch having first and second states;

locking means for locking said switch in at least one of said first and second states; and key means for allowing said switch and said locking means to be switched between said first and second states.

4. The computer system of claim 3 wherein said computer system includes a housing and wherein said locking means is mounted to said housing.

5. The computer system of claim 1 wherein said access control means includes:
- a first switch having a first input coupled to said power supply, a first output coupled to said external data drive, and a second output;
- a second switch having a first input coupled to said second output of said first switch and an output coupled to said external data drive; and
- a timer having an input coupled to said second output of said first switch and an output coupled to a second input of said second switch.

6. The computer system of claim 5 wherein said second switch is a relay.

7. The computer system of claim 5 wherein said second switch is a transistor.

8. The computer system of claim 5 wherein said timer generates a timing signal at said output of said timer after having received an input signal from said first switch for a first period.

9. The computer system of claim 8 wherein said first period exceeds a boot-up period.

10. The computer system of claim 1 wherein said access control means is coupled to plural external data drives and selectively makes or breaks an electrical connection between said power supply and said plural external data drives.

11. The computer system of claim 10 wherein said access control means controls said plural external data drives individually.

12. A data security device for a computer system for controlling addition and removal of data using an external data drive coupled to said computer system, comprising:
- a computer system including a microprocessor, memory, internal data storage, a power supply, and an external data drive; and
- access control means, coupled between said power supply and said external data drive, for selectively making or breaking an electrical connection between said power supply and said external data drive to prevent the addition and removal of data from said computer system using said external data drive, said access control means including:
  - a switch coupled to said power supply and having on and off states;
  - timing means, coupled to said switch, for generating a timing signal when said switch is in said off state for a first period;
  - means, coupled to said timing means and said switch, for making an electrical connection between said switch and said external data drive until said timing signal is received and for breaking said electrical connection when said timing signal is received.

13. The computer system of claim 12 wherein when said switch is in said on state, said switch couples said power supply to said external data drive.

14. The computer system of claim 12 wherein when said switch is in said off state, said switch couples said power supply to said timing means and said means for breaking.

15. The computer system of claim 12 wherein said means for breaking includes a relay.

16. The computer system of claim 12 wherein said means for breaking includes a transistor.

17. A method for controlling the addition and removal of data from a computer system using an external data drive coupled to said computer system, comprising the steps of:
- providing a switch, a lock and a key;
- making or breaking an electrical connection between a power supply and an external data drive using said switch, said lock and said key; and
- preventing the addition and removal of data from said computer system from said external data drive using said switch, said lock and said key.

18. The method of claim 17 further comprising the steps of:
- coupling said switch between said power supply and said external data drive;
- generating a timing signal when said switch remains in a first state for a first period;
- making an electrical connection between said switch and said external data drive before said timing signal is generated; and
- breaking said electrical connection after said timing signal is generated.

19. The method of claim 18 further comprising the step of:
- coupling said power supply to said external data drive using said switch when said switch is in said first state.

20. The method of claim 19 further comprising the step of:
- coupling said power supply to a timer and a relay when said switch is in a second state.

* * * * *